(12) United States Patent
Umemoto et al.

(10) Patent No.: US 6,565,224 B1
(45) Date of Patent: May 20, 2003

(54) LIGHT PIPE, SURFACE LIGHT SOURCE UNIT AND REFLECTION TYPE LIQUID-CRYSTAL DISPLAY DEVICE

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/709,516

(22) Filed: Nov. 13, 2000

(30) Foreign Application Priority Data

Nov. 10, 1999 (JP) .......................................... 11-319909

(51) Int. Cl.[7] .............................................. G02B 27/10
(52) U.S. Cl. ........................ 362/31; 362/582; 362/330; 362/551; 362/561
(58) Field of Search .................. 362/31, 330, 339, 362/551, 561, 582; 349/63

(56) References Cited

U.S. PATENT DOCUMENTS 6,167,182 A  * 12/2000 Shinohara et al. .......... 385/129
6,366,409 B1 *  4/2002 Umemoto et al. .......... 359/628

* cited by examiner

Primary Examiner—Sandra O'Shea
Assistant Examiner—Anabel Ton
(74) Attorney, Agent, or Firm—Sughrue Mion, PLLC

(57) ABSTRACT

A light pipe has an upper surface, a lower surface, an incidence side surface, and light output means constituted by a repetitive prismatic structure and formed in said upper surface so that light incident on said incidence side surface exits from said lower surface through said light output means but light incident on said lower surface is transmitted through said upper surface. The light pipe has a refractive index in a range of from 1.51 to 1.55, and information light generated on said lower surface of said light pipe is transmitted to said upper surface of said light pipe so as to be made visible at said upper surface. In a surface light source unit, a light source is disposed on the incidence side surface of the above-mentioned light pipe. In a reflection type liquid-crystal display device, a liquid-crystal cell including a reflection layer is disposed on a lower surface of the above-mentioned light pipe or on a lower surface of a light pipe contained in the above-mentioned surface light source unit.

6 Claims, 1 Drawing Sheet

LIGHT PIPE, SURFACE LIGHT SOURCE UNIT AND REFLECTION TYPE LIQUID-CRYSTAL DISPLAY DEVICE

BACKGROUND OF THE INVENTION

1. Field of the Invention

The present invention relates to a light pipe and a surface light source unit that can be used for forming a reflection type liquid-crystal display device which is excellent in light utilizing efficiency and which is bright and easy to view.

The present application is based on Japanese Patent Applications No. Hei. 11-319909, which is incorporated herein by reference.

2. Description of the Related Art

A surface light source unit permitting a reflection type liquid-crystal display device to be viewed in a dark place, or the like, has been in great demand. In the meantime, the inventor of the present invention has tried to apply a front-lighting system in which a back-lighting type surface light source unit used in a transmission type liquid-crystal display device is disposed on the viewing side of a liquid-crystal cell. Such a back-lighting type surface light source unit uses a light pipe provided with a light output means so that light incident on a side surface exits from either one of the upper and lower surfaces through the light output means.

In the front-lighting system, however, the contents of display are viewed through the light pipe. Hence, in the background-art surface light source unit using such a back-lighting type light pipe, there was a problem that display was hard to view because of shortage of contrast in use of external light both at the time of switching-on and at the time of switching-off. The shortage of contrast was mainly caused by over lapping between display light and reflected light of leaking light and external light at a surface of the light pipe and low light output efficiency of the light pipe.

SUMMARY OF THE INVENTION

An object of the present invention is to develop a light pipe and a surface light source unit that can be adapted for a front-lighting system and used for forming a reflection type liquid-crystal display device which is excellent in contrast in viewing both at the time of switching-off and at the time of switching-on, excellent in brightness of display and excellent in clarity.

According to the present invention, there are provided: a light pipe comprising a plate-like member having a refractive index in a range of from 1.51 to 1.55, the plate-like member having an upper surface, a lower surface, and an incidence side surface, the plate-like member further having a light output means constituted by a repetitive prismatic structure and formed in the upper surface so that light incident on the incidence side surface exits from the lower surface through the light output means but light incident on the lower surface is transmitted through the upper surface, whereby information light generated on the lower surface of the light pipe is transmitted to the upper surface of the light pipe so as to be made visible at the upper surface; a surface light source unit in which a light source is disposed on an incidence side surface of the above-mentioned light pipe; and a reflection type liquid-crystal display device in which a liquid-crystal cell including a reflection layer is disposed on a lower surface of the above-mentioned light pipe or on a lower surface of a light pipe contained in the above-mentioned surface light source unit.

According to the present invention, a light pipe and a surface light source unit used for a front-lighting system can be obtained to thereby make it possible to form a reflection type liquid-crystal display device which is excellent in contrast in viewing both at the time of switching-on and at the time of switching-off, and which is excellent in display brightness and clarity. This is because the refractive index of the light pipe is set to be in a range of from 1.51 to 1.55 so that leaking light or reflected light of external light at a surface of the light pipe is balanced with light output efficiency of the light pipe.

That is, when the light pipe is made of a low refractive index material such as polymethyl methacrylate having a refractive index of 1.485, the light pipe lacks light output efficiency in display at the time of switching-on. Hence, because a large amount of light leaks from the surface of the light pipe, display becomes so dark that contrast is apt to run short. When the light pipe is made of a high refractive index material such as polycarbonate having a refractive index of 1.59, surface reflection overlapping with display light in display using external light is large. Hence, display becomes so dark that contrast is apt to run short. Therefore, when a light pipe having a refractive index in a range of from 1.51 to 1.55 is used, surface reflection overlapping with display light can be suppressed so that shortage of contrast in display using external light can be prevented. Moreover, the angle range permitting transmission light to be fully reflected is so wide that the light output efficiency can be improved. Moreover, light leaking from the surface of the light pipe can be suppressed so that shortage of contrast in display also at the time of switching-on can be prevented.

Further, when the light output means of the light pipe is constituted by a repetitive prismatic structure each consisting of a combination of a short side surface and a long side surface having predetermined inclination angle ranges respectively, the light pipe can be obtained as a light pipe providing output light excellent in perpendicular directivity. Hence, there can be obtained a surface light source unit which is excellent in the quantity of light in a frontal direction perpendicular to a liquid-crystal cell so that brighter display at the time of switching-on can be achieved and which is excellent in light utilizing efficiency for a front-lighting system because display image through the light pipe is hardly disordered. Hence, there can be obtained a reflection type liquid-crystal display device excellent in display quality.

Features and advantages of the invention will be evident from the following detailed description of the preferred embodiments described in conjunction with the attached drawings.

DETAILED DESCRIPTION OF THE PREFERRED EMBODIMENTS

Figure 1:
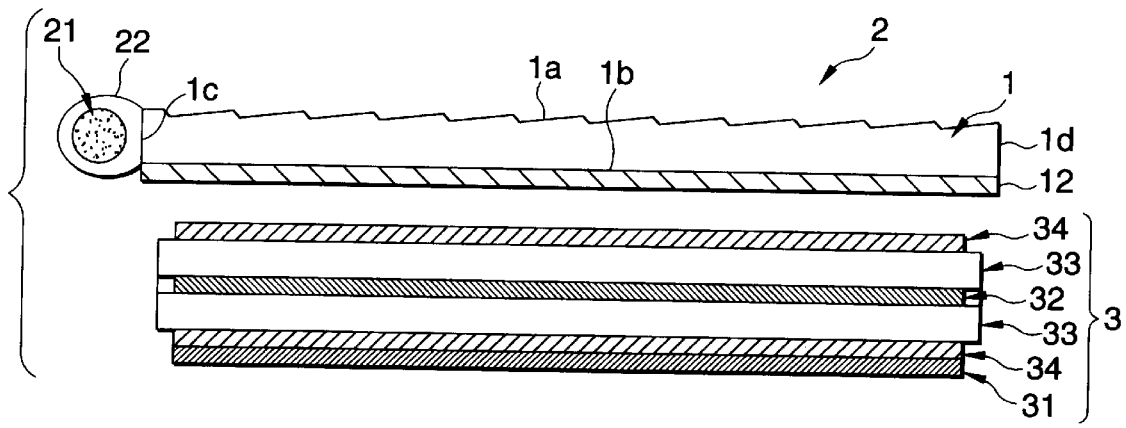
FIG. 1 is a side view for explaining an embodiment of a reflection type liquid-crystal display device.

According to the present invention, a light pipe comprises a plate-like member having a refractive index in a range of from 1.51 to 1.55, the plate-like member having an upper surface, a lower surface, and an incidence side surface, the plate-like member further having a light output means constituted by a repetitive prismatic structure and formed in the upper surface so that light incident on the incidence side surface exits from the lower surface through the light output means but light incident on the lower surface is transmitted through the upper surface, whereby information light generated on the lower surface of the light pipe is transmitted to the upper surface of the light pipe so as to be made visible at the upper surface. A surface light source unit is configured so that a light source is disposed on an incidence side surface of the above-mentioned light pipe. A reflection type liquid-crystal display device is configured so that a liquid-crystal cell including a reflection layer is disposed on a lower surface of the above-mentioned light pipe or on a lower surface of a light pipe contained in the above-mentioned surface light source unit. FIG. 1 shows an embodiment of the reflection type liquid-crystal display device. The reference numeral 1 designates a light pipe; 2, a surface light source unit; 21, a light source; 3, a liquid-crystal display panel; and 31, a reflection layer.

The light pipe is constituted by a plate-like member having a refractive index in a range of from 1.51 to 1.55. As shown in FIG. 1, the plate-like member has an upper surface 1a, a lower surface 1b opposite to the upper surface 1a, and an incidence side surface 1c which is one of side surfaces between the upper and lower surfaces 1a and 1b. A light output means is formed in the upper surface 1a. The light output means is constituted by a repetitive prismatic structure. The plate-like member may be of an equal thickness type as shown in FIG. 1 or may be shaped like a wedge, etc. so that a counter end 1d opposite to the incidence side surface is set to be thinner than the incidence side surface 1c. The reduction in thickness of the counter end is advantageous in terms of reduction in weight, improvement in entrance efficiency of light from the incidence side surface to the light output means of the upper surface, etc.

The light output means having a repetitive prismatic structure formed in the upper surface of the light pipe may be made of a suitable material exhibiting characteristic in which light incident on the incidence side surface is made to exit from the lower surface through the light output means and in which light incident on the lower surface is transmitted so as to exit from the upper surface. A light output means having slopes facing the incidence side surface is preferable from the point of view of permitting light incident on the incidence side surface to be made to exit from the lower surface through the upper surface effectively with good directivity, permitting light incident on the lower surface to be transmitted to exit from the upper surface efficiently without scattering, etc. Particularly, it is preferable that the light output means has a repetitive prismatic structure each consisting of a combination of a slope inclined at an inclination angle in a range of from 30 to 45 degrees with respect to a reference plane of the lower surface, and a flat surface inclined at an inclination angle of not larger than 10 degrees with respect to the reference plane.

Figure 2:
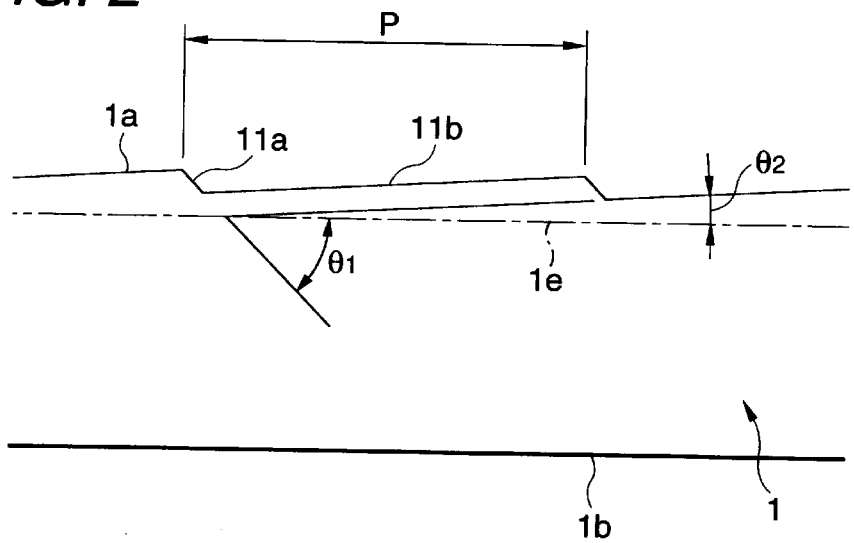
FIG. 2 is a side view for explaining prismatic structures in the light pipe.

The repetitive structure of prismatic structures may be constituted by convex or concave portions each having equal side surfaces. From the point of view of light utilizing efficiency, permitting light exiting from the lower surface to be turned over by the reflection layer to exit from the upper surface with good directivity in a frontal (perpendicular) direction, etc., it is particularly preferable that the irregularity structure has a configuration in which each of the prismatic structures consists of a combination of a short side surface 11a ($\theta_1$) inclined down from the incidence side surface 1c toward the counter end 1d at an inclination angle in a range of from 30 to 45 degrees with respect to the reference plane 1e of the lower surface 1b, and a long side surface 11b ($\theta_2$) with an inclination angle in a range of from 0 to 10 degrees with respect to the reference plane 1e as shown in FIG. 2. Incidentally, discrimination between convex portions and concave portions is based on a line connecting the short side surfaces and the long side surfaces to a plane for formation thereof. That is, discrimination between convex portions and concave portions is made by the fact as to whether the points (vertices) of intersection between the short side surfaces and the long side surfaces are protruded (convex) or depressed (concave) from the line.

In the prismatic structures, the short side surfaces 11a perform a role of reflecting a part of light given to the short side surfaces among the light incident on the side surface to thereby supply the reflected light to the lower surface 1b. In this case, setting the inclination angle $\theta_1$ of the short side surfaces to be in a range of from 30 to 45 degrees permits transmission light to be reflected with good perpendicular property to the lower surface. As a result, the direction of the maximum intensity of output light can be controlled within 30 degrees with respect to a normal-line direction of the lower surface. Accordingly, output light (illumination light) excellent in frontal directivity can be obtained efficiently through the reflection layer 31 shown in FIG. 1. Hence, bright display can be achieved.

When the reflection characteristic of the reflection layer of the reflection type liquid-crystal cell is of a normal distribution type, from the point of view of achievement of bright display in a frontal direction on the basis of frontal directivity, etc., it is preferable that the inclination angle $\theta_1$ of the short side surfaces is in a range of from 32 to 44 degrees, particularly in a range of from 33 to 43 degrees, more particularly in a range of from 35 to 42 degrees in consideration of efficient full reflection of light which is transmitted in the inside of the light pipe.

Incidentally, a part of light transmitted through the short side surfaces without satisfying the full reflection condition forms leaking light. The leaking light has little influence on viewing in a direction near the frontal direction because the leaking light exits at an angle of not smaller than 60 degrees with respect to the frontal direction. If the inclination angle $\theta_1$ is larger than 45 degrees, there is a disadvantage in light utilizing efficiency because the light leaking from the upper surface 1a shows a tendency to increase. If the inclination angle $\theta_1$ is smaller than 30 degrees, there is a disadvantage in viewing in a frontal direction because the direction of the maximum intensity of output light forms a larger angle than 30 degrees with respect to the normal-line direction of the lower surface. As a result, light is fully reflected by the lower surface of the light pipe, so that the amount of light that cannot exit from the lower surface increases. This causes light leaking from the upper surface, so that display quality shows a tendency to decrease.

On the other hand, the long side surfaces 11b are provided for the purposes of: reflecting transmission light incident on the long side surfaces to thereby supply the reflected light to the short side surfaces and turning over the reflected light of the short side surfaces through the reflection layer 31 so that the light is transmitted to exit from the upper surface 1a; and receiving external light in a reflection mode so that the external light is reflected by the reflection layer 31 and transmitted to exit from the upper surface 1a. From this point of view, it is preferable that the inclination angle $\theta_2$ of the long side surfaces with respect to the reference plane 1e of the lower surface is in a range of from 0 to 10 degrees.

Although the inclination angle $\theta_2$ of the long side surfaces may be 0 degrees (horizontal), setting the angle to be larger than 0 degrees permits transmission light to be collimated when the transmission light incident on the long side surfaces is reflected to be supplied to the short side surfaces. In this case, directivity of light reflected by the short side surfaces can be enhanced to be favorable to display.

On the other hand, if the inclination angle is larger than 10 degrees, the rate of light incident on the long side surfaces is lowered. As a result, light supply to the counter end side runs short, so that light emission is apt to be uneven. Moreover, the change of the optical path due to refraction becomes large, so that the quantity of light in the frontal direction is lowered disadvantageously in display. Moreover, in the sectional shape of the light pipe, it becomes difficult to reduce the thickness on the counter end side. Hence, the quantity of light incident on the prismatic structures is also reduced, so that light emission efficiency is apt to From the point of view of the aforementioned performance such as condensation of output light and increase of the quantity of light in the frontal direction due to the collimation of transmission light, suppression of leaking light, etc., it is preferable that the inclination angle $\theta_2$ of the long side surfaces is not larger than 8 degrees, particularly not larger than 5 degrees. Adjusting the inclination angles of the short and long side surfaces as described above permits directivity to be given to output light. Hence, light can be made to go out in a direction perpendicular to the lower surface or at an angle near the perpendicular direction.

From the point of view of visual recognition of a display image through the long side surfaces of the light pipe, etc., it is preferable that the long side surfaces are configured such that the angle difference in inclination angle $\theta_2$ between the long side surfaces is set to be not larger than 5 degrees, particularly not larger than 4 degrees, more particularly not larger than 3 degrees on the whole of the light pipe and in which the difference in inclination angle $\theta_2$ between adjacent ones of the long side surfaces is set to be not larger than 1 degree, particularly not larger than 0.3 degrees, more particularly not larger than 0.1 degrees. Hence, the difference in inclination angle $\theta_2$ between the long side surfaces through which light is transmitted can be prevented from having influence on the display image. If the deflection in transmission angle of the long side surfaces varies largely in accordance with the place, the display image is apt to be unnatural. Particularly if the deflection difference between transmission images is large in the vicinity of adjacent pixels, the display image is apt to be remarkably unnatural.

The aforementioned angle difference in inclination angle $\theta_2$ is determined on the assumption that the inclination angle of the long side surfaces is not larger than 10 degrees as described above. That is, the angle difference is determined on the assumption that deflection of the display image due to refraction of light transmitted through the long side surfaces is suppressed to set the small inclination angle $\theta_2$ to be in an allowable range. This purpose is that the optimum viewing direction of the liquid-crystal display device optimized by setting a point of observation in a direction near the perpendicular direction is prevented from being changed.

In the above description, if the display image is deflected, the optimum viewing direction is displaced from the direction near the perpendicular direction. Moreover, if the deflection of the display image is large, the viewing direction comes near to the output direction of light leaking from the upper surface of the light pipe so that the leaking light may be apt to have influence such as lowering of contrast on the viewing direction. Incidentally, the condition for setting the inclination angle $\theta_2$ of the long side surfaces to be not larger than 10 degrees contains a requirement that the influence of dispersion of transmitted light is suppressed to be negligible.

From the point of view of obtaining a bright display image, it is preferable that the repetitive structure is excellent in efficiency of incidence of external light and excellent in efficiency of transmission of the display image through the liquid-crystal cell or efficiency of output of the display image from the liquid-crystal cell. From this point of view, the repetitive structure is preferably provided as prismatic structures in which the projected area of the long side surfaces on the reference plane of the lower surface is not smaller than 5 times, particularly not smaller than 10 times, more particularly not smaller than 15 times as large as that of the short side surfaces. Hence, a great part of the display image generated by the liquid-crystal cell can be transmitted Incidentally, in transmission of the display image through the liquid-crystal cell, the display image incident on the short side surfaces is reflected on the incident side surface so as not to go out from the upper surface or is deflected so as to go out in a direction largely different from and opposite to the direction of the display image transmitted through the long side surfaces with a normal line of the lower surface as a reference. Hence, the display image incident on the short side surfaces has little influence on the display image transmitted through the long side surfaces. Hence, from the point of view of prevention of unnatural display due to shortage of transmission of display light, etc., it is preferable that the area of overlap of pixels with the short side surfaces is reduced to thereby keep the light transmittance of the long In consideration that the pixel pitch of the liquid-crystal cell is generally in a range of from 100 to 300 $\mu$m, it is preferable from the aforementioned point of view that each of the short side surfaces is formed to be not larger than 40 $\mu$m in terms of the projected width thereof on the reference plane of the lower surface. Incidentally, as the projected width of the short side surface decreases, a higher-grade technique is required for forming the short side surface. If the vertices of the prismatic structures are rounded with a curvature of radius not smaller than a predetermined value, a scattering effect appears to cause disorder of the display image easily. Further, because the coherence length of a fluorescent tube is generally set to be about 20 $\mu$m, reduction of the projected width of the short side surface causes lowering of display quality due to diffraction easily. Accordingly, it is particularly preferable that the projected width of the short side surface is in a range of from 1 to 20 $\mu$m, more preferably in a range of from 5 to 15 $\mu$m.

From the aforementioned point of view, it is preferable that the distance between adjacent ones of the short side surfaces is large. As described above, however, the short side surfaces serve as a functional portion for substantially outputting light incident on the side surface. Hence, if the distance is too large, illumination at the time of switching-on becomes so sparse that display may be unnatural. In consideration of these, the repetition pitch P of the prismatic structures as shown in FIG. 2 is preferably set to be in a range of from 50 $\mu$m to 1.0 mm. Incidentally, the pitch may be constant or may be irregular as represented by a random pitch or a random or regular combination of a predetermined number of pitch units.

When the light output means is constituted by prismatic structures, moire may occur because of interference between the light output means and pixels of the liquid-crystal cell. Although prevention of moire can be made by the adjustment of the pitch of the prismatic structures, the pitch of the prismatic structures is limited to the aforementioned preferable range. Hence, measures against the case where moire occurs in the pitch range are a subject of discussion.

In the present invention, the aforementioned measures against moire may be taken as follows. That is, in order to prevent moire from occurring, the prismatic structures are preferably formed to be inclined with respect to the reference plane of the incidence side surface 1c so that the prismatic structures can be arranged to cross pixels. On this occasion, if the inclination angle is too large, deflection occurs in reflection by the short side surfaces. As a result, large deviation occurs in the direction of output light. Hence, anisotropy in the intensity of light emission in the light-transmitting direction of the light pipe becomes large, so that light utilizing efficiency is lowered. This is apt to cause lowering of display quality.

From the aforementioned point of view, the inclination angle of the direction of arrangement of the prismatic structures, that is, the direction of the ridgeline of the prismatic structures with respect to the reference plane of the incidence side surface is preferably set to be in a range of ±30 degrees, particularly in a range of ±28 degrees, more particularly in a range of ±25 degrees. Incidentally, the symbol "±" means the direction of inclination with the incidence side surface as a reference. If the resolution of the liquid-crystal cell is so low that no moire occurs or moire is negligible, it is preferable that the prismatic structures are arranged to be as parallel with the incidence side surface as possible.

The light pipe can be formed into a suitable shape as described above. Also in the case where the light pipe is shaped like a wedge, etc., the shape can be determined suitably. For example, a suitable surface shape such as a linear surface or a curved surface can be used. Further, the slopes or prismatic structures constituting the light output means may be formed into a suitable surface shape such as a linear surface, a folded surface or a curved surface.

Further, irregularities such as prismatic structures may be constituted by a combination of irregularities different in shape, etc. in addition to the pitch. In addition, the irregularities such as prismatic structures may be formed as a series of convex or concave portions having ridgelines continuously connected to one another or may be formed as intermittent convex or concave portions discontinuously arranged at intervals of a predetermined distance in the direction of the ridgeline.

The shape of the lower surface or incidence side surface in the light pipe is not particularly limited and may be determined suitably. Generally, a surface as smooth and flat as possible is formed as the lower surface and a surface perpendicular to the lower surface is formed as the incidence side surface. For example, a shape such as a concavely curved shape corresponding to the outer circumference of the light source may be used as the shape of the incidence side surface so that efficiency of incidence of light can be enhanced. Further, the incidence side surface may be provided as an incidence side surface structure having an introduction portion interposed between the light source and the light pipe. In this case, the introduction portion maybe formed into a suitable shape corresponding to the light source, or the like.

The light pipe may be made of a suitable material exhibiting transparency in accordance with the wave range of the light source and having a refractive index in a range of from 1.51 to 1.55. Examples of the material include norbornene resin, polyester resin, denatured polycarbonate resin, methacrylic acid-styrene copolymer, etc. In the light pipe, by using a material having such a refractive index, it is possible to balance improvement of light output efficiency against surface reflection loss.

Assume now that a light pipe made of polymethyl methacrylate having a refractive index of 1.485 and a surface reflectance of 3.81% is regarded as a reference in the above description. When the refractive index increases to 1.51, the surface reflectance increases to 4.13% to improve the frontal brightness by about 10%. When the refractive index increases to 1.55, the surface reflectance increases to 4.65% to improve the frontal brightness by about 25%. When the refractive index increases to 1.58, there is, however, a disadvantage from the point of view of consistency of display using external light with display using illumination light through the light pipe because the surface reflectance increases to 5.12% so that the rate of increasing reflection loss becomes higher than the rate of increasing brightness though the frontal brightness is improved by about 30%. Incidentally, a light pipe made of a material exhibiting as small birefringence as possible may be used preferably from the point of view of display quality, etc.

The light pipe may be formed by a suitable method such as a cutting method. From the point of view of mass production, preferably, examples of the production method include: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, ultraviolet rays or radial rays is polymerized in the condition that the fluid resin is cast in a mold capable of forming a predetermined shape or the mold is filled with the fluid resin; and so on.

Incidentally, the light pipe need not be formed as a monolithic single-layer plate made of one kind of material. For example, the light pipe may be formed as a laminate of parts made of one kind of material or different kinds of materials. For example, the light pipe may be provided as a laminate in which a sheet having a light output means (upper surface) such as prismatic structures adheres to a light guide portion for performing transmission of light.

The thickness of the light pipe may be determined suitably in accordance with the size of the light pipe, the size of the light source, etc. in accordance with the purpose of use. Generally, the thickness of the light pipe used for forming a liquid-crystal display device, or the like, is not larger than 10 mm, particularly in a range of from 0.1 to 5 mm, more particularly in a range of from 0.3 to 3 mm in terms of the thickness of the incidence side surface. From the point of view of achievement of bright display, etc., in a preferable light pipe, the total light transmittance of incident light in the vertical direction between the upper and lower surfaces, particularly the total light transmittance of perpendicular incident light from the lower surface to the upper surface, is not lower than 90%, particularly not lower than 92%, more particularly not larger than 95%; and the haze is not higher than 30%, particularly not higher than 15%, more particularly not higher than 10%.

For example, the light pipe is used for forming a side-lighting type front-lighting system by which information light (3) generated in the lower surface of the light pipe 1 as shown in FIG. 1 is viewed from the upper surface of the light pipe. Hence, light incident on the upper and lower surfaces can be transmitted to exit from the lower or upper surface efficiently. Light collimated accurately by use of the light pipe can be made to go out in a direction excellent in perpendicularity favorable for viewing. Hence, light from a light source can be utilized so efficiently that a surface light source unit excellent in brightness can be formed.

Further, various devices can be formed by use of the aforementioned light pipe. For example, there can be formed a power-saving reflection type liquid-crystal display device which is excellent in contrast in viewing both at the time of switching-off and at the time of switching-on and excellent in display brightness because light leaking from the upper surface hardly overlaps with a display image and which is excellent in clarity, easy to view and excellent in display quality because the display image through the light pipe is hardly disordered.

Incidentally, in practical use of the light pipe, an anti-reflection layer 12 as shown in FIG. 1 may be provided on the lower surface 1b of the light pipe as occasion demands. The anti-reflection layer is provided for suppressing surface reflection in a range of from about 4.1 to about 4.7% at the lower surface as described above. The provision of the anti-reflection layer makes it possible to reduce return light, etc. at the lower surface. Hence, improvement of display quality can be attained. The anti-reflection layer can be formed as a suitable transparent layer in accordance with the background art. Examples of the anti-reflection layer include: an optical multi-layer film of dielectric, fluorine-containing polymer, low-density material, or the like; and a refractive index layer.

The preferable anti-reflection layer can achieve prevention of reflection on the whole of the visible light range. The particularly preferable anti-reflection layer has a reflectance of not higher than 1.5%, particularly not higher than 1.0% on the basis of light having a wavelength of 550 nm which is the center wavelength of the visible light range and which has the highest visibility level. Incidentally, the anti-reflection layer may be provided directly on the lower surface of the light pipe by a suitable method such as a coating method or a vapor deposition method. Alternatively, the anti-reflection layer may be provided by a method in which a sheet of the anti-reflection layer supported by a transparent substrate is bonded to the lower surface of the light pipe through a suitable adhering means such as an adhesive layer. The method for forming the anti-reflection layer is not particularly limited.

For example, the surface light source unit may be formed by arrangement of a light source 21 on the incidence side surface 1c of the light pipe 1 as shown in FIG. 1. A suitable member may be used as the light source. Generally, a linear light source such as a (cold or hot) cathode tube, a point light source such as a light-emitting diode, an array of point light sources arranged linearly or a linear light source using a device for converting a point light source into a state of linear light emission at regular or irregular intervals may be preferably used as the light source. From the point of view of power saving, durability, etc., a cold-cathode tube is particularly preferable.

The surface light source unit may be formed as a combination in which suitable assisting means such as a light source holder 22 for enclosing the light source to lead light scattered from the light source 21 to the incidence side surface 1c of the light pipe as shown in FIG. 1, etc. are arranged as occasion demands. A resin sheet coated with a high-reflectance metal thin film, a sheet of metal foil, or the like, is generally used as the light source holder. If the light source holder is stuck to the end portion of the light pipe through an adhesive agent, or the like, the formation of the light output means in the adhesive portion can be omitted.

As described above, the surface light source unit according to the present invention provides light excellent in light utilizing efficiency, bright and excellent in perpendicularity. It is easy to increase the area of the surface light source unit. Hence, the surface light source unit may be used as a front-lighting system preferably applied to various devices such as a reflection type liquid-crystal display device, etc. A power-saving reflection type liquid-crystal display device bright and easy to view can be obtained. Incidentally, the surface light source unit can be switched on/off by a suitable method.

FIG. 1 shows an embodiment of a reflection type liquid-crystal display device using the surface light source unit 2 according to the present invention as a front-lighting system. The reference numeral 3 designates a reflection type liquid-crystal panel; 32, a liquid-crystal layer; and 33, a cell substrate. These parts form a liquid-crystal cell. The reference numeral 34 designates a polarizing plate; and 31, a reflection layer. The reflection type liquid-crystal display device may be formed by arrangement of the liquid-crystal cell having the reflection layer provided on the light exit side of the surface light source unit as shown in FIG. 1, that is, on the lower surface of the light pipe 1.

Generally, the reflection type liquid-crystal display device is formed by assembling a liquid-crystal cell having a transparent electrode functioning as a liquid-crystal shutter, a driver attached to the liquid-crystal cell, a polarizing plate, a front-lighting unit and a reflection layer and by assembling constituent parts such as a diffusing layer, a compensatory retarder, etc. suitably as occasion demands. In the present invention, the reflection type liquid-crystal display device can be formed in accordance with the background art without any specific limitation except that the light pipe or the surface light source unit is used on the front side so that the liquid-crystal display device is viewed from the upper surface side of the light pipe having the light output means. Incidentally, the transparent electrode is not shown in FIG. 1.

Hence, the liquid-crystal cell to be used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell. Further, the method for driving liquid crystal is not particularly limited. For example, a suitable drive method such as an active matrix method or a passive matrix method may be used.

Figure 3:
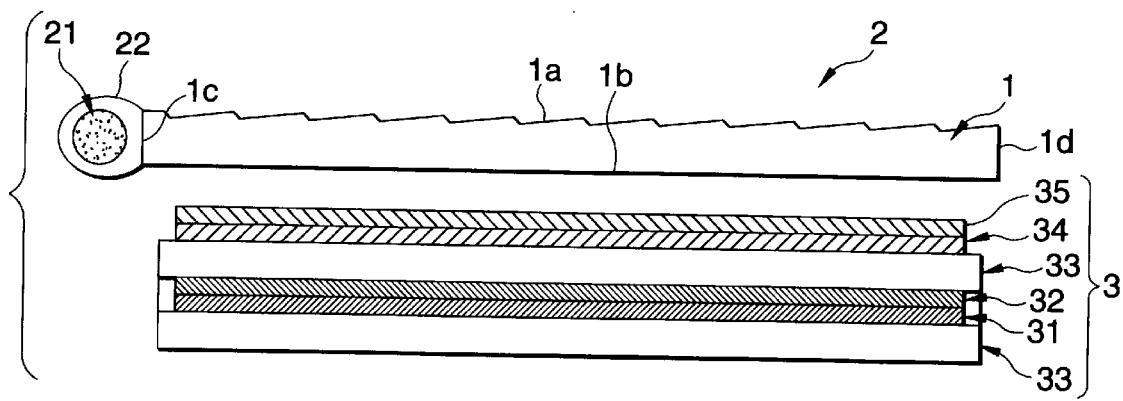
FIG. 3 is a side view for explaining another embodiment of the reflection type liquid-crystal display device.

The arrangement of the reflection layer is essential to the reflection type liquid-crystal display device. The position of arrangement of the reflection layer is optional. For example, the reflection layer may be provided outside the liquid-crystal display panel 3 as shown in FIG. 1. Alternatively, the reflection layer 31 may be attached to the cell substrate 33 and provided inside the liquid-crystal cell as shown in FIG. 3. The reflection layer may be formed as a suitable reflection layer according to the background art. Examples of the reflection layer include: a coating layer containing powder of a high-refractive-index metal such as aluminum, silver, gold, copper or chromium in a binder resin; a layer of a metal thin film deposited by a vapor deposition method, or the like; a reflection sheet having the coating or deposited layer supported by a substrate; a sheet of metal foil; and so on. For example, the reflection layer provided inside the liquid-crystal cell may be formed of a transparent electrically conductive film, or the like.

A suitable material can be used as the polarizing plate. From the point of view of obtaining good-contrast display due to incidence of high-grade linearly polarized light, etc., a material high in the degree of polarization such as an absorption type linear polarizer of iodine or dye may be used preferably. Incidentally, when the reflection type liquid-crystal display device is formed, a suitable optical device such as a diffusing layer 35, a protective layer or a compensatory retarder may be arranged suitably as shown in FIG. 3. In this case, a material exhibiting so weak diffusing characteristic that the display image is not disordered maybe used preferably as the diffusing layer.

On the other hand, the compensatory retarder is provided for compensating for wavelength dependence of birefringence, or the like, to attain improvement of visibility, or the like. The compensatory retarder is disposed either between the visual side polarizing plate and the liquid-crystal cell and between the back side polarizing plate and the liquid-crystal cell as occasion demands. A suitable material in accordance with the wave range may be used as the compensatory retarder. The compensatory retarder may be formed as a single layer or as a multilayer of two or more phase-difference layers.

The reflection type liquid-crystal display according to the present invention is viewed through light transmitted through the surface light source unit, particularly through the long side surfaces of the light pipe in the surface light source unit. That is, when the surface light source unit is switched on, light exiting from the lower surface of the light pipe is reflected by the reflection layer via the polarizing plate, the liquid-crystal layer, etc. The reflected light reaches the light pipe via the liquid-crystal layer, the polarizing plate, etc. in the reverse course. Thus, a display image transmitted through the long side surfaces is viewed. In this case, intensive leaking light exits in a direction largely different in angle from the frontal direction perpendicular to the liquid-crystal cell. Hence, because leaking light exiting in the frontal direction is weak, a display image excellent in display quality can be viewed through the long side surfaces in a direction near the frontal direction.

On the other hand, also in the case where external light is used when the surface light source unit is switched off, incident light from the long side surfaces in the upper surface of the light pipe is transmitted through the polarizing plate, the liquid-crystal layer, the reflection layer, etc. and reaches the light pipe in the reverse course in the same manner as described above. Thus, a display image transmitted through the long side surfaces can be viewed in a direction near the frontal direction in a state in which the display image is little in disorder due to the light pipe and excellent in display quality.

Optical devices or parts such as a light pipe, a liquid-crystal cell, a polarizing plate, etc. for forming the surface light source unit or the liquid-crystal display device may be wholly or partially integrally laminated/fixed onto one another or may be disposed separably. From the point of view of prevention of lowering of contrast based on suppression of surface reflection, etc., it is preferable that such parts are fixed onto one another. It is preferable that at least the lower surface of the light pipe in the surface light source unit is fixed closely to the upper surface of the liquid-crystal cell. A suitable transparent adhesive agent such as a tackifier may be used for the closely fixing process. A layer of the transparent adhesive agent may be made to contain transparent particles so that the layer is provided as an adhesive layer exhibiting a diffusing function.

EXAMPLE 1

A plate-like member of a norbornene resin (made by JSR Corp.) having a refractive index of 1.51 and processed into a predetermined shape in advance was cut by a diamond bit to thereby form a light pipe having a light output means. The light pipe had a width of 40 mm and a depth of 25 mm. The light pipe had an incidence side surface having a thickness of 1 mm, and a counter end having a thickness of 0.6 mm. The light pipe had flat upper and lower surfaces. The light pipe had prismatic structures in the upper surface. The prismatic structures were disposed at intervals of a pitch of 210 $\mu$m so as to be parallel with the incidence side surface. The prismatic structures had short side surfaces, and long side surfaces. The inclination angles of the short side surfaces changed in a range of from 42.5 to 43 degrees. The inclination angles of the long side surfaces changed in a range of from 1.8 to 3.5 degrees. The inclination angle difference between adjacent ones of the long side surfaces was not larger than 0.1 degrees. The projected width of each of the short side surfaces on the lower surface was in a range of from 10 to 16 $\mu$m. The ratio of the projected area of the long side surfaces on the lower surface to the projected area of the short side surfaces on the lower surface was not lower than 12. Incidentally, the prismatic structures were formed to start from a position far by 2 mm from the incidence side surface.

An anti-reflection layer constituted by a multi-layer film of five dielectric layers was provided on a triacetylcellulose film to prepare an anti-reflection sheet having a reflectance of about 0.2% with respect to light with a wavelength of 550 nm. The anti-reflection sheet was stuck onto the lower surface of the light pipe through an adhesive layer so that the anti-reflection layer was located on the outside. Then, a cold-cathode tube having a diameter of 2 mm was disposed on the incidence side surface of the light pipe. The cold-cathode tube was enclosed in a holder made of a silver reflection sheet. An end portion of the holder was bonded to the upper and lower surfaces of the light pipe so that the cold-cathode tube was fixed. An inverter and a DC power supply were connected to the cold-cathode tube. Thus, a surface light source unit was obtained. The light source could be switched on/off by turning on/off the power supply.

Then, a monochrome reflection type TN liquid-crystal panel was disposed on the lower surface of the light pipe in the surface light source unit. Thus, a reflection type liquid-crystal display device was obtained. The device was driven by a method of switching on/off all pixels.

EXAMPLE 2

A light pipe, a surface light source unit and a reflection type liquid-crystal display device were obtained in the same manner as in Example 1 except that the plate-like member was replaced by a plate-like member of a norbornene resin (made by Nippon Zeon Co., Ltd.) having a refractive index of 1.52.

EXAMPLE 3

A light pipe, a surface light source unit and a reflection-type liquid-crystal display device were obtained in the same manner as in Example 1 except that the plate-like member was replaced by a plate-like member of a polyester resin having a refractive index of 1.54.

Comparative Example 1

A light pipe, a surface light source unit and a reflection type liquid-crystal display device were obtained in the same manner as in Example 1 except that the plate-like member was replaced by a plate-like member of a polymethyl methacrylate resin having a refractive index of 1.48.

Comparative Example 2

A light pipe, a surface light source unit and a reflection type liquid-crystal display device were obtained in the same manner as in Example 1 except that the plate-like member was replaced by a plate-like member of a polycarbonate resin having a refractive index of 1.59.

Evaluation Test 1

The frontal brightness of the reflection type liquid-crystal display device obtained in each of Examples and Comparative Examples was measured by a brightness meter (BM7, made by Topcon Corp.) in the condition that the surface light source unit was switched on. Results of the measurement were shown in Table 1.

TABLE 1

|  | Example 1 | Example 2 | Example 3 | Comparative Example 1 | Comparative Example 2 |
|---|---|---|---|---|---|
| Frontal Brightness (cd/m$^2$) | 49 | 52 | 54 | 43 | 57 |
| Brightness Ratio (%) | 114 | 121 | 126 | 100*1 | 133 |

*1: standard

Evaluation Test 2

A line pattern was displayed on an STN reflection type liquid-crystal display panel. The surface light source unit obtained in each of Examples and Comparative Examples was disposed on the display panel so that the upper surface of the light pipe was located on the viewing side. Clarity of a display state at the time of switching off the surface light source unit or at the time of switching on the surface light source unit was evaluated by randomly selected ten observers so as to be classified into five levels with five points as the maximum.

Results of the evaluation test were shown in Table 2. In Table 2, "Ex" means an example, "Co" means a comparative example and "Ob" means an observer.

TABLE 2

|  | Switching Off | | | | | Switching On | | | | |
|---|---|---|---|---|---|---|---|---|---|---|
|  | Ex1 | Ex2 | Ex3 | Co1 | Co2 | Ex1 | Ex2 | Ex3 | Co1 | Co2 |
| Ob1 | 4.5 | 4.5 | 4 | 5 | 3 | 4.5 | 5 | 5 | 3 | 4 |
| Ob2 | 5 | 4 | 4 | 5 | 2 | 4 | 5 | 5 | 3 | 5 |
| Ob3 | 4 | 4 | 4 | 5 | 3 | 5 | 5 | 5 | 4 | 4 |
| Ob4 | 5 | 5 | 4 | 5 | 2 | 4 | 4 | 5 | 3 | 5 |
| Ob5 | 4.5 | 4.5 | 4 | 5 | 3 | 4 | 4 | 5 | 3 | 4.5 |
| Ob6 | 5 | 4 | 3 | 5 | 2 | 3 | 3 | 4 | 3 | 5 |
| Ob7 | 4 | 4 | 3 | 5 | 2 | 4 | 4 | 5 | 3 | 5 |
| Ob8 | 4.5 | 4.5 | 4 | 5 | 3 | 4.5 | 4.5 | 4.5 | 4 | 5 |
| Ob9 | 4 | 4 | 4 | 5 | 3 | 4 | 4 | 4 | 4 | 5 |
| Ob10 | 4.5 | 4.5 | 4 | 5 | 3 | 4 | 4 | 5 | 3 | 4.5 |

Evaluated points in Table 2 were added up. Results of the adding-up were shown in Table 3.

TABLE 3

|  | Example 1 | Example 2 | Example 3 | Comparative Example 1 | Comparative Example 2 |
|---|---|---|---|---|---|
| Switching Off | 45 | 43 | 38 | 50 | 26 |
| Switching On | 41 | 42.5 | 47.5 | 33 | 47 |
| Total | 86 | 85.5 | 85.5 | 83 | 73 |

It is proved from Table 1 that Examples are brighter by at least 10% than Comparative Example 1. It is proved from Tables 2 and 3 that the evaluation worth is reduced in order of Comparative Example 1, Example 1, Example 2, Example 3 and Comparative Example 2 at the time of switching-off and that the evaluation worth is reduced in order of Example 3, Comparative Example 2, Example 2, Example 1 and Comparative Example 1 at the time of switching-on. Incidentally, Comparative Example 2 was evaluated by all the observers so that display was hardly viewed at the time of switching-off because of surface reflection. On the other hand, Example 3 and Comparative Example 2 were evaluated by almost all the observers so that display was bright and easy to view. Comparative Example 1 was evaluated by three observers so that display was hard to view particularly in an oblique viewing direction because a large amount of light leaked from the upper surface. Also Comparative Example 2 was evaluated by three observers so that display was whitish.

It is proved from the above description that Comparative Examples are inferior in balance between an external light mode and an illumination mode so that Comparative Example 1 is good in the external light mode but worst in display quality in the illumination mode and Comparative Example 2 is good in the illumination mode but worst in display quality in the external light mode whereas Examples are excellent in balance between the two modes. Hence, it is proved that display bright and easy to view both at the time of switching-on and at the time of switching-off can be achieved according to the present invention.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:

an upper surface;

a lower surface;

an incidence side surface; and light output means constituted by a repetitive prismatic structure and formed in said upper surface so that light incident on said incidence side surface exits from said lower surface through said light output means but light incident on said lower surface is transmitted through said upper surface, wherein said light pipe has a refractive index in a range of from 1.51 to 1.55, and information light generated on said lower surface of said light pipe is transmitted to said upper surface of said light pipe so as to be made visible at said upper surface.

2. A light pipe according to claim 1, wherein said light output means has a repetitive prismatic structure arranged at intervals of a pitch in a range of from 50 μm to 1.0 mm, each of said prismatic structures is constituted by a combination of a short side surface and a long side surface; each of said short side surfaces is made of a slope inclined down from said incidence side surface toward a counter end opposite to said incidence side surface at an inclination angle in a range of from 30 to 45 degrees with respect to a reference plane of said lower surface and a projected area of said short side surfaces on said reference plane is not larger than 40 μm; each of said long side surfaces is made of a slope having an inclination angle in a range of from 0 to 10 degrees with respect to said reference plane, a difference between inclination angles of said long side surfaces is not larger than 5 degrees as a whole, a difference between inclination angles of adjacent ones of said long side surfaces is not larger than 1 degree, and a projected area of said long side surfaces on said reference plane is not smaller than five times as large as that of said short side surfaces; and said prismatic structures have ridgelines having an inclination angle in a range of ±30 degrees with respect to a reference plane of said incidence side surface.

3. A light pipe according to claim 1, wherein an anti-reflection layer is provided on said lower surface.

4. A surface light source unit comprising:

a light pipe according to claim 1; and a light source disposed on an incidence side surface of said light pipe.

5. A reflection type liquid-crystal display device comprising:

a light pipe according to claim 1; and a liquid-crystal cell including a reflection layer and disposed on said lower surface of said light pipe.

6. A reflection type liquid-crystal display device comprising:

a surface light source unit according to claim 4; and a liquid-crystal cell including a reflection layer and disposed on said lower surface of said light pipe in said surface light source unit.

* * * * *